(12) United States Patent
Chen et al.

(10) Patent No.: US 7,467,170 B1
(45) Date of Patent: Dec. 16, 2008

(54) SAMPLE GENERATION METHOD AND SYSTEM FOR DIGITAL SIMULATION PROCESSES

(75) Inventors: Ernest C. Chen, San Pedro, CA (US); Paul R. Anderson, Hermosa Beach, CA (US); Joseph Santoru, Agoura Hills, CA (US); Tammy G. Liu, Cambridge, MA (US)

(73) Assignee: The DIRECTV Group, Inc., El Segundo, CA (US)

( * ) Notice: Subject to any disclaimer, the term of this patent is extended or adjusted under 35 U.S.C. 154(b) by 799 days.

(21) Appl. No.: 10/669,211

(22) Filed: Sep. 23, 2003

(51) Int. Cl.
    *G06F 1/02* (2006.01)
(52) U.S. Cl. ...................................... 708/250
(58) Field of Classification Search ................. 708/250, 708/254
    See application file for complete search history.

(56) References Cited

U.S. PATENT DOCUMENTS

| | | | |
|---|---|---|---|
| 4,667,301 A | 5/1987 | Chiu et al. | |
| 5,007,087 A | 4/1991 | Bernstein et al. | |
| 5,463,720 A * | 10/1995 | Granger | 358/1.9 |
| 5,515,307 A | 5/1996 | Aiello et al. | |
| 5,828,752 A | 10/1998 | Iwamura et al. | |
| 5,872,725 A | 2/1999 | Ninomiya et al. | |
| 6,097,815 A | 8/2000 | Shimada | |
| 6,141,668 A | 10/2000 | Shimada | |
| 7,000,188 B1 * | 2/2006 | Eustace | 715/716 |
| 2004/0199444 A1 * | 10/2004 | Woodcock et al. | 705/35 |

* cited by examiner

*Primary Examiner*—Chuong D Ngo

(57) ABSTRACT

A method for generating a set of random numbers with statistics represented by a cumulative density function (CDF) includes generating a set of uniformly spaced samples between an upper limit and a lower limit. Each of the uniformly spaced samples are then mapped to a corresponding value on a cumulative density function curve. The set of uniformly spaced samples are then scrambled to randomize the samples. Companding may also be incorporated in the sample generation process.

26 Claims, 3 Drawing Sheets

SAMPLE GENERATION METHOD AND SYSTEM FOR DIGITAL SIMULATION PROCESSES

TECHNICAL FIELD

The present invention relates to a method and system for generating random numbers with a specified probability density function that is faster and more efficient than current methods and systems.

BACKGROUND OF THE INVENTION

Methods for generating random numbers with a specified probability density function (PDF) are well known. One such method is the Monte Carlo method. The Monte Carlo method provides approximate solutions to a variety of mathematical problems by performing statistical sampling experiments on a computer. The method applies to problems with no probabilistic content as well as to those with inherent probabilistic structure.

While the conventional Monte Carlo method is often an acceptable sampling method, it is typically accurate only after it has converged in statistics. This convergence can take a very large number of random samples to provide the desired accuracy. For example, a simulator utilizing the Monte Carlo method may include many loops (for example, "For Loops" would be used in C), nested or otherwise, to generate an accurate statistical sample with multiple random variables. Running such loops with the many iterations can take hours or days, depending on the speed of the computer or processor. Further, the amount of time may increase more than linearly with the number of samples or the number of loops required to achieve convergence. Effective random-number generation is therefore desirable.

Other prior techniques for generating random numbers with a specified PDF utilized "brute force." For example, a random number sequence uniformly distributed between 0 and 1 was first generated by calling on known system-provided routines. One difficulty with this approach is that it can take a very large amount of data before a sufficiently uniform distribution is realized depending upon application requirements. In cases where non-uniformly distributed random numbers are required, a controlled mapping was typically implemented in a conventional way to "shape" the numbers with the desired PDF. This could be done, for example, by building a lookup table, again with a brute-force mapping. This again can be extremely time consuming.

Thus, it would be desirable to provide a random number generation method that is quicker than prior methods and also reduces the number of samples that must be generated to achieve the desired statistical accuracy.

SUMMARY OF THE INVENTION

It is therefore an object of the present invention to provide a random number generation method and system that requires less computing time than prior methods.

It is a further object of the present invention to provide a random number generation method that reduces the number of samples needed to obtain a given overall accuracy for low-occurrence events.

It is still another object of the present invention to provide a random number generation system that is both systematic and efficient.

In accordance with the above and other objects of the present invention, a random number generation method halving a cumulative density function (CDF) is provided. (The CDF is the integral of the PDF). According to the method, a set of discrete numbers between an upper limit and a lower limit is generated. The set of discrete numbers are uniformly spaced between the upper limit and the lower limit. Each individual number from the set of random numbers is mapped to a corresponding value on a cumulative density function curve to provide a number of samples. The samples are then scrambled to randomize the order of the samples.

As an additional step, the number of samples can be subjected to companding in certain applications. The step of companding helps provide a sufficient representation of a low-probability area, while decreasing the total number of samples.

These and other features and advantages of the present invention will become apparent from the following description of the invention, when viewed in accordance with the accompanying drawings and appended claims.

BRIEF DESCRIPTION OF THE PREFERRED EMBODIMENT

The present invention is intended to allow random numbers of any distribution to be generated, such as through Monte Carlo simulation, in a significantly reduced period of time compared to prior systems and methods. The disclosed system may be used in a lab environment with general purpose computers with coupled displays or may alternatively be implemented in commercial products with special-purpose processors. Moreover, the present invention may be utilized for a variety of applications for which random number generation is or can be used.

Figure 1:
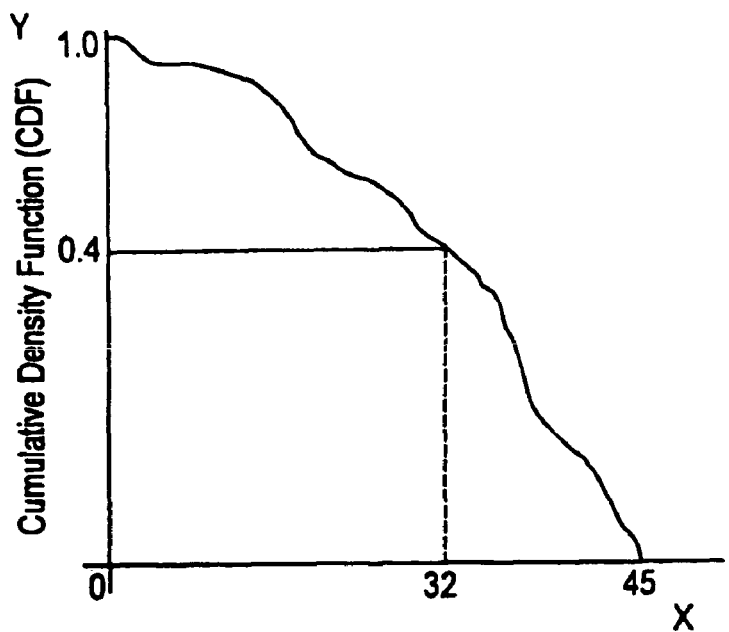
FIG. 1 is a graph schematically illustrating the mapping of uniform random numbers to generate a given cumulative density function (CDF) in accordance with a preferred embodiment of the present invention.
Figure 2:
FIG. 2 is a graph schematically illustrating the identification of a low-probability area of the CDF for companding in accordance with a preferred embodiment of the present invention.
Figure 3:
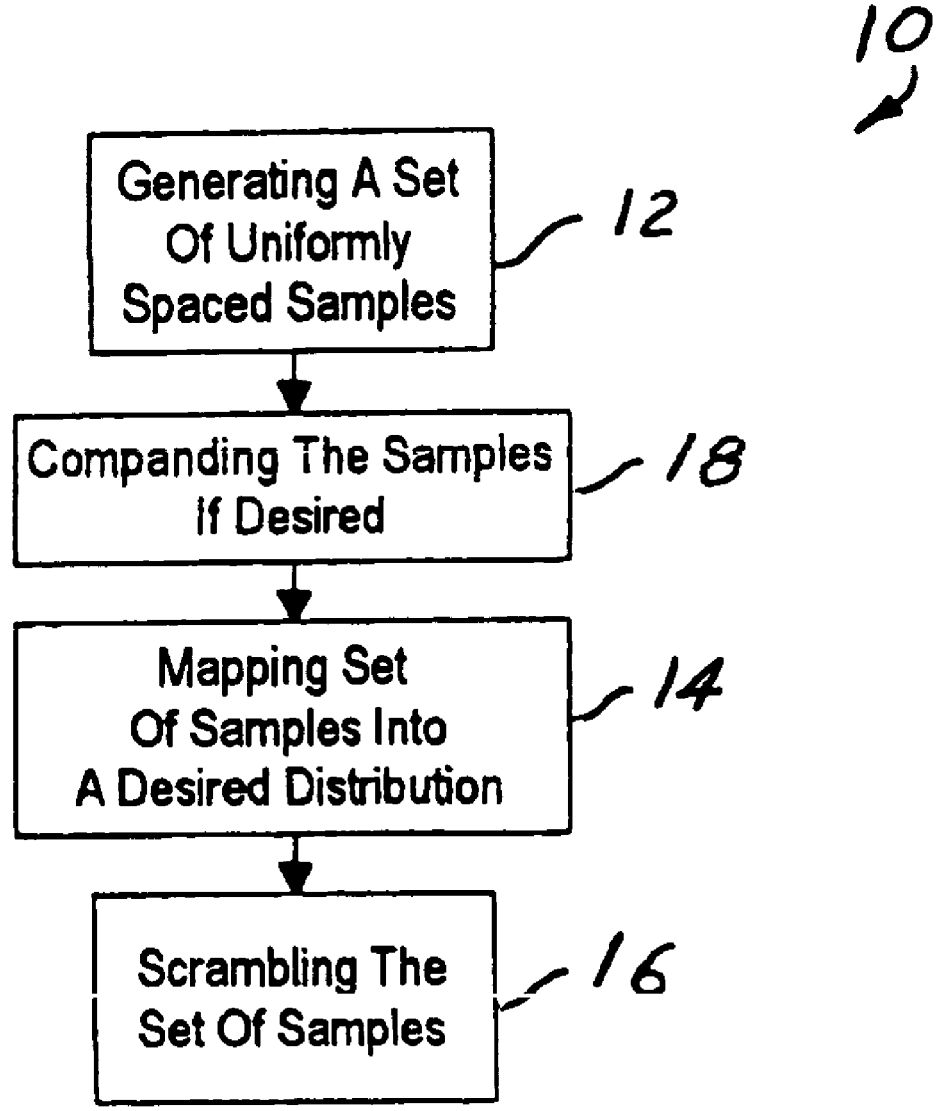
FIG. 3 is a flow chart schematically illustrating the sequence and operation of a random number generation system and method in accordance with a preferred embodiment of the present invention.

Referring generally to FIGS. 1-5 and now specifically to FIG. 3, the preferred system and method 10 preferably comprises three components. The first component is an initial sample generation component 12, which generates numbers with immediate uniform distribution. In accordance with the number generation component 12, a set of numbers {R} is generated. The set of random numbers is preferably generated such that they have a uniform distribution between 0 and 1. Equivalently, instead of a uniform distribution between 0 and 1, random percentages may be generated to have a uniform distribution between 0% and 100%.

The first component of the invention, as generally indicated by reference number 12, improves distribution of random numbers by generating evenly spaced values for {Y} between 0 and 1. This process provides a uniform representation across the interval of [0, 1]. It gives a smooth appearance to performance curves compiled from processing random numbers. With conventional generation methods, it would take a much larger number of samples to achieve the same curve smoothness. Alternatively, instead of generating random uniform samples for {R}, R can be replaced with an evenly spaced set of values {Y}. This provides a curve with an even smoother appearance.

In the second component of the invention, shown by reference number 14 of FIG. 3, thereafter, a set of values {X} are generated in ascending order with a specified PDF and a corresponding set of descending CDF values. This is accomplished through a lookup table listing X vs. Y values on the CDF curve, an illustrative example of which is shown in FIG. 1. The designator X is a random number with a CDF Y, and Y(X) is the probability that a randomly selected number from the set will be greater than or equal to X. In order to look-up the X value for a given input value $R_i$ in {R}, the conventional concept is to compare the randomly quantified number $R_i$ with members of {Y} to find the closest discrete value $Y_k$ to $R_i$ and therefore the corresponding value $X_k$. In other words, a value in the random source set {R} is selected and mapped or looked-up on the CDF curve/table to determine the corresponding value. This process is repeated with each member of {R} to get a set of numbers with the specified CDF.

As shown in FIG. 1, the CDF starts with a numerical value of 1.0 and decreases to 0. (For our convenience and without loss of generality, this ascending order of the CDF is reversed from the normal convention, which has a CDF beginning at 0 and increasing to a numerical value of 1). By arranging {R} in a monotonic order, as automatically provided by component 12, the process of comparing $R_i$ to each sequential member of {Y}, beginning at $Y_1$, can stop at the first value $Y_k$ which is found to be less than $R_i$. This process would then be repeated for every member in {R}.

The preferred method provides a more efficient way to look up the X value for each input element in {R}. Initially, all values of {R} are arranged in, say, a descending order. Since both {Y} and {R} are in descending order, it would not be necessary to begin at $Y_1$ each time to find the nearest value n {M}. Since the next value of R, $R_{k+1}$, is smaller than $R_k$, $Y_{k+1}$ is smaller or equal to $Y_K$. In fact, $Y_{K+1}$ is very close to $Y_K$, and the search becomes very fast. Since significantly fewer comparisons with candidate numbers are required, significant overall savings in processing time can be achieved through utilization of the disclosed method and system. After the lookup has been completed, the order of {X} values are scrambled, as generally indicated by reference number 16. Order randomization may be achieved in one of several ways. For example, it may be done by generating a pseudo-random number (PRN) sequence {P}, which is then truncated to the length of {X} if necessary. {X} is then reordered by the elements of {P} as the latter are generated one at a time.

The first and second components of the invention may be combined as follows. First, {R} is generated by uniform stepping between 1 and 0 in descending order. The {X} values are then generated in ascending order with table lookup. The lookup process proceeds without the need for pre-sorting {R}. As set forth above, at the end of lookup, the {X} values are then scrambled. Again, scrambling is systematic and is more efficient than the brute force comparison, discussed above.

The third component of the invention, as generally indicated by reference number 18, is the companding component. In many applications, the companding improves the representation of certain regions of interest on the PDF. This concept is particularly useful for PDFs where a section of interest has a much lower probability. This means that very few points are generated in this region by the conventional method, which therefore requires a much larger number of experiment samples to guarantee a sufficient representation of the low probability section. As the required numbers of samples increases, the run-time may increase even more rapidly. At the same time, more than enough samples are generated for the high probability areas of the PDF and are thus "wasted." Thus, the companding component increases the representation of low-probability samples without increasing the representation high-probability samples.

For example, a given PDF might have 90% of its events happening between A and B in FIG. 2, but only 10% between B and C. Suppose the impact region of interest is from the scarce region between B and C. For each sample X generated between B and C as desired, 9 samples between A and B would normally be generated as well. This is where the method of companding comes in. With companding, 10 times as many random points {R} would be generated between 0 and 0.1 of Y, as would normally be generated. This is accompanied with a corresponding reduction in the number of samples generated between the popular region between 0.1 and 1.0 of Y for a given number or total samples. After all the points are generated and statistically processed, the overrepresented section is re-adjusted by dividing the probability of that section by the companding factor N. Therefore, the low-probability samples are compressed while the high-probability samples are expanded. In effect, by reducing the spacing for low-probability samples, more samples are present in the low-probability area. By increasing the spacing for the high-probability area, fewer samples are present in the high-probability area.

Figure 4A:
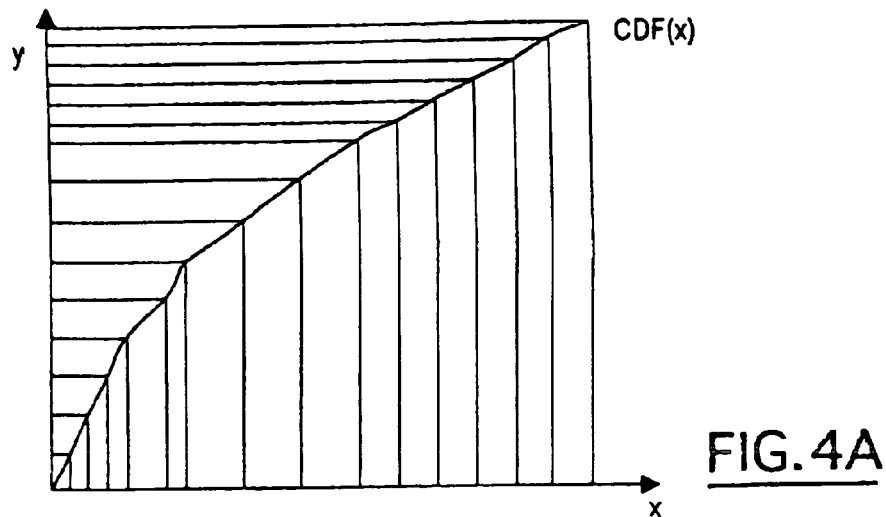
FIG. 4(a) is a graph illustrating a sample without companding.
Figure 4B:
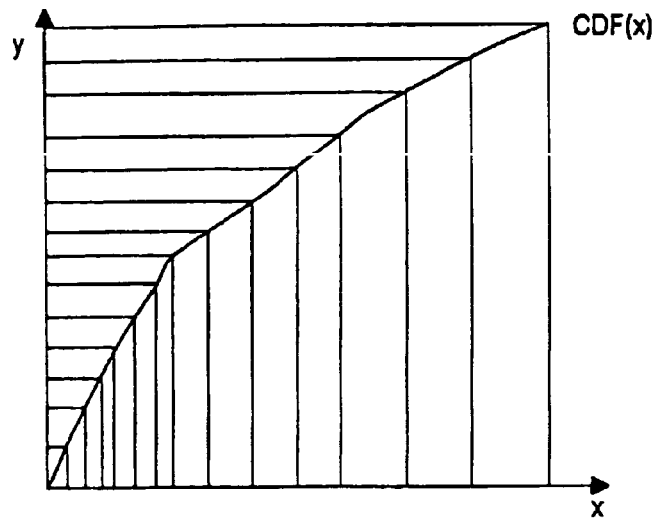
FIG. 4(b) is a graph illustrating a sample with companding.

FIGS. 4(*a*) and 4(*b*) illustrate two exemplary graphs (with CDF slopes in the conventional sense). FIG. 4(*a*) illustrates a sample generation without companding (Y sampling uniformly spaced). FIG. 4(*b*) illustrates a sample with companding. As shown by comparison of the Figures, the distribution of the samples provides a more accurate representation of the low-probability curve.

The combination of these three components provides a very efficient and accurate method and system for generating a set of random numbers with a given PDF.

Figure 5:
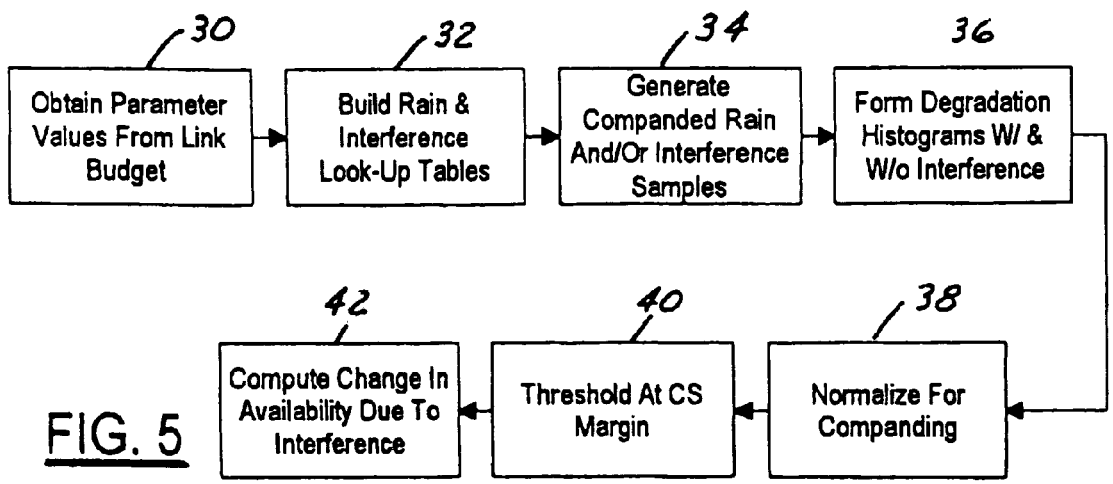
FIG. 5 is a flow chart schematically illustrating the sequence and operation of an exemplary application of a random number generation system and method in accordance with a preferred embodiment of the present invention.

Turn now to FIG. 5, which illustrates an exemplary application for the disclosed method and system. Preferred applications for the present invention include an impact analysis of rain and interference on satellite service availability. More specifically, this application allows a more thorough statistical link budget analysis when multiple statistical parameters must be analyzed. This has not previously been performed due to the huge amount of simulation that would be required to simulate interactions of the various parameters. By making such simulations feasible, the disclosed method can allow a more accurate link budget and provides better knowledge about a given system's capabilities, all with manageable computer processing time. By obtaining the total system performance statistics, worst case assumptions can be minimized. This will allow a more balanced design for optimal system performance within the limits of all resources.

Referring specifically to FIG. 5, rain and interference have been typically constant in past analysis, but can now be time-varying. Thus, to determine the total impact of rain and interference, they can be combined in a Monte Carlo fashion.

Initially, the parameter values from the link budget are obtained, as generally indicated by reference number 30. Thereafter, lookup tables for rain and interference impact CDFs are built and presented to the user on a display, as generally indicated by reference number 32, based on a variety of factors, as will be appreciated by one of skill in the art.

Companded rain and/or an interference samples can then be generated based on the look-up tables, as generally indicated by reference number 34. Degradation histograms (PDFs) from rain with and without interference are then formed, as generally indicated by reference number 36. The histograms for these two cases are normalized for companding, as generally indicated by reference number 38. The threshold of clear sky (CS) margin is then determined at 40. Finally, the change in availability due to interference can then be determined, as generally indicated by reference number 42.

In general, the present invention provides a method for generating a set of random numbers with statistics represented by a cumulative density function. In one methodology of the invention, the method includes the steps of generating a set of uniformly spaced samples between an upper limit and a lower limit, mapping each one of the set of uniformly spaced samples to a corresponding value on a cumulative density function curve, and scrambling the set of uniformly spaced samples.

In addition, the present invention also provides a method of random number generation with a desired cumulative density function. In one methodology of the invention, the method includes the steps of generating a set of discrete samples between an upper limit and a lower limit, uniformly stepping the set of discrete samples in descending order between the upper limit and the lower limit, and mapping the set of random numbers to a set of values stored in ascending order and having a specified probability density function.

Furthermore, the present invention also provides a random number generation system. In one embodiment of the invention, the system includes (i) a first component for generating uniformly spaced numbers, independent of a total number of samples; (ii) a second component for mapping the generated random numbers into a desired distribution through table lookup and scrambling; and (iii) a third component for reducing the total number of samples needed to achieve a given statistical accuracy.

Having now fully described the invention, it will be apparent to one of ordinary skill in the art that many changes and modifications can be made thereto without departing from the spirit or scope of the invention as set forth herein.

What is claimed is:

1. A method for generating and analyzing random sample values on a computer, said method comprising the steps of:
    (a) generating a set of numbers that are substantially uniformly distributed between an upper numerical limit and a lower numerical limit;
    (b) utilizing a computer to map each one of said numbers to a corresponding sample value on a cumulative density function (CDF) curve;
    (c) collecting each said sample value into an ordered set of sample values;
    (d) scrambling said ordered set of sample values so as to reorder said sample values in a substantially random manner and thereby form a random set of sample values;
    (e) utilizing said random set of sample values to form a histogram-type output; and
    (f) presenting the output on a display for statistical analysis.

2. The method of claim 1, wherein said numbers are ordered in descending order, and said sample values are ordered in ascending order.

3. The method of claim 1, wherein said upper numerical limit is substantially equal to 1, and said lower numerical limit is substantially equal to 0.

4. The method of claim 1, wherein said upper numerical limit is substantially equal to 100%, and said lower numerical limit is substantially equal to 0%.

5. The method of claim 1, wherein said cumulative density function curve is represented by a look-up table stored on said computer.

6. The method of claim 5, wherein each one of said numbers is mapped to a corresponding sample value on said cumulative density function curve by particularly looking up each said corresponding sample value in said look-up table without the need for pre-sorting said numbers.

7. The method of claim 1, said method further comprising the step of:
    generating at least one alternative set of numbers via companding such that said numbers are substantially uniformly distributed and more closely interspaced in at least one section between said upper numerical limit and said lower numerical limit so as to ensure that a sufficient amount of corresponding sample values can be successfully collected from any low-probability area defined by said cumulative density function curve and that any said low-probability area is therefore not disproportionately underrepresented by said sample values.

8. The method of claim 7, said method further comprising the step of determining a percentage number of sample values collectable from said low-probability area as compared to a percentage number of sample values collectable from a high-probability area defined by said cumulative density function curve.

9. The method of claim 8, said method further comprising the steps of:
    increasing the number of sample values collected from said low-probability area by a companding factor; and
    decreasing the number of sample values collected from said high-probability area by said companding factor;
    wherein said companding factor is based on a comparison between said percentage number of sample values collectable from said low-probability area and said percentage number of sample values collectable from said high-probability area.

10. The method of claim 9, said method further comprising the step of dividing the probability of collecting sample values from said high-probability area by said companding factor.

11. The method of claim 1, wherein the statistical analysis comprises a statistical analysis of satellite service availability.

12. The method of claim 1, wherein the set of numbers is generated from a Monte Carlo simulation of satellite service availability.

13. A method for generating and analyzing random sample values on a computer according to a probability density function (PDF), said method comprising the steps of:
    (a) generating a set of numbers that are substantially uniformly distributed and spaced apart between an upper numerical limit and a lower numerical limit;
    (b) utilizing a computer to map each one of said numbers to a corresponding sample value on a cumulative density function (CDF) curve, which is mathematically related to said probability density function and represented by a look-up table stored on said computer;

(c) collecting each said sample value into an ordered set of sample values;

(d) scrambling said ordered set of sample values so as to reorder said sample values in a substantially random manner and thereby form a random set of sample values;

(e) utilizing said random set of sample values to form histogram-type output; and (f) presenting the output on a display for statistical analysis.

14. The method of claim 13, wherein step (d) is at least partially accomplished by utilizing a pseudo-random number (PRN) sequence.

15. The method claim 13, wherein said upper numerical limit is substantially equal to 1, and said lower numerical limit is substantially equal to 0.

16. The method of claim 13, wherein said upper numerical limit is substantially equal to 100%, and said lower numerical limit is substantially equal to 0.

17. The method of claim 13, said method further comprising the step of:

generating alternative sets of numbers via companding such that said alternative sets of numbers are spaced apart between said upper numerical limit and said lower numerical limit so as to ensure that sufficient amounts of corresponding sample values can be successfully collected from any low-probability area and any high-probability area defined by said cumulative density function curve.

18. The method of 17, wherein said companding is at least partially accomplished by:

reducing the spacing between said numbers in at least one section between said upper numerical limit and said lower numerical limit so as to ensure that a sufficient amount of corresponding sample values can be successfully collected from any low-probability area defined by said cumulative density function curve and that any said low-probability area is therefore not disproportionately underrepresented by said sample values; and increasing the spacing between said numbers in at least one other section between said upper numerical limit and said lower numerical limit so as to ensure that a sufficient amount of corresponding sample values can be successfully collected from any high-probability area defined by said cumulative density function curve while also ensuring that said high-probability area is not disproportionately overrepresented by said sample values.

19. The method of claim 13, wherein the statistical analysis comprises a statistical analysis of satellite service availability.

20. The method of claim 13, wherein the set of numbers is generated from a Monte Carlo simulation of satellite service availability.

21. A system for generating and analyzing random sample values on a computer, said system comprising:

a computer; and a look-up table stored on said computer;

wherein said computer is operable to (a) generate a set of numbers that are substantially uniformly distributed between an upper numerical limit and a lower numerical limit;

(b) map each one of said numbers to a corresponding sample value on a cumulative density function (CDF) curve that is represented by said look-up table;

(c) collect each said sample value into an ordered set of sample values;

(d) scramble said ordered set of sample values so as to reorder said sample values in a substantially random manner and thereby form a random set of sample values;

(e) utilize said random set of sample values for form a histogram-type output; and (f) present the output on a display for statistical analysis.

22. The system of claim 21, wherein said upper numerical limit is substantially equal to 1 or 100%, and said lower numerical limit is substantially equal to 0 or 0%.

23. The system of claim 21, wherein said computer is also operable to generate alternative sets of numbers via companding such that said alternative sets of numbers are spaced apart between said upper numerical limit and said lower numerical limit so as to ensure that sufficient amounts of corresponding sample values can be successfully collected from any low-probability area and any high-probability area defined by said cumulative density function curve.

24. The system of claim 21, wherein said numbers are ordered in descending order, and said sample values are ordered in ascending order.

25. The method of claim 21, wherein the statistical analysis comprises a statistical analysis of satellite service availability.

26. The method of claim 21, wherein the set of numbers is generated from a Monte Carlo simulation of satellite service availability.

* * * * *